United States Patent
DeBattista

(10) Patent No.: US 9,041,834 B2
(45) Date of Patent: May 26, 2015

(54) SYSTEMS AND METHODS FOR REDUCING NOISE IN VIDEO STREAMS

(71) Applicant: ZiiLabs Inc., Ltd., Hamilton HM DX (BM)

(72) Inventor: Aaron DeBattista, Surrey (GB)

(73) Assignee: ZiiLabs Inc., Ltd., Hamilton (BM)

( * ) Notice: Subject to any disclaimer, the term of this patent is extended or adjusted under 35 U.S.C. 154(b) by 239 days.

(21) Appl. No.: 13/622,977

(22) Filed: Sep. 19, 2012

(65) Prior Publication Data

US 2014/0078347 A1    Mar. 20, 2014

(51) Int. Cl.
| H04N 5/217 | (2011.01) |
| H04N 5/00 | (2011.01) |
| G06K 9/40 | (2006.01) |
| G06K 9/38 | (2006.01) |
| G06T 5/00 | (2006.01) |
| H04N 5/357 | (2011.01) |

(52) U.S. Cl.
CPC ............ *G06T 5/002* (2013.01); *H04N 5/357* (2013.01); *G06T 2207/10016* (2013.01); *G06T 2207/20028* (2013.01); *G06T 2207/20182* (2013.01); *Y10S 348/908* (2013.01); *Y10S 348/909* (2013.01)

(58) Field of Classification Search
None
See application file for complete search history.

(56) References Cited

U.S. PATENT DOCUMENTS

| 2003/0039310 A1* | 2/2003 | Wu et al. ................. 375/240.16 |
| 2005/0135699 A1* | 6/2005 | Anderson ..................... 382/261 |
| 2006/0158562 A1* | 7/2006 | Rhee ............................. 348/607 |
| 2008/0069203 A1* | 3/2008 | Karczewicz et al. ..... 375/240.01 |
| 2008/0118179 A1* | 5/2008 | Jeong et al. ................... 382/275 |
| 2009/0278945 A1 | 11/2009 | Lin |
| 2009/0278961 A1 | 11/2009 | Mohanty et al. |
| 2010/0061648 A1* | 3/2010 | Wong et al. ................... 382/260 |
| 2010/0188535 A1 | 7/2010 | Mitsuya et al. |
| 2010/0195926 A1 | 8/2010 | Sasaki |
| 2010/0265404 A1 | 10/2010 | McCarthy et al. |
| 2011/0228167 A1* | 9/2011 | Sasaki ........................... 348/607 |

OTHER PUBLICATIONS

"Int'l Application Serial No. PCT/GB2013/052435, Search Report & Written Opinion mailed Feb. 12, 2014", 11 pgs.

* cited by examiner

*Primary Examiner* — Timothy J Henn
*Assistant Examiner* — Quan Pham
(74) *Attorney, Agent, or Firm* — Kwan & Olynick LLP

(57) ABSTRACT

Disclosed are apparatus and methods for denoising a video stream of a camera. A current frame of the video stream and a temporally adjacent frame of the video stream that has been previously spatially and temporally denoised are obtained. The current frame is first spatially denoised, while preserving edges in such current frame to generate a plurality of spatially denoised pixels for the current frame. A particular pixel of the current frame is then both spatially and temporally denoised based on a weighted averaging of the particular pixel's associated spatially denoised pixel from the current frame and a plurality of pixels from the temporally adjacent frame that have already been spatially and temporally denoised.

20 Claims, 4 Drawing Sheets

SYSTEMS AND METHODS FOR REDUCING NOISE IN VIDEO STREAMS

TECHNICAL FIELD OF THE INVENTION

This invention relates generally to reducing noise in video streams. More specifically, this invention relates to reducing noise in video streams obtained by hand-held cameras.

BACKGROUND

Video denoising for camera sensors has been the area of much research and development work in the past decades. Noise is a serious problem in a lot of sensors, especially when shooting in low lighting conditions and under varying illumination conditions. Also, correct performance of other video processing algorithms often requires noise reduction. In video encoding, video denoising can lead to bit stream size reduction that is achieved, among others, by increased performance of specific modules (e.g., motion estimation algorithm) in the encoder unit. The performance of image, video, and computer vision algorithms (e.g. tracking and detection) may also depend on the level of noise in the signal It would be beneficial to provide improved methods and apparatus for video denoising.

SUMMARY OF THE INVENTION

The following section presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of denoising a video stream of a camera is disclosed. A current frame of the video stream and a temporally adjacent frame of the video stream that has been previously spatially and temporally denoised are obtained. The current frame is spatially denoised, while preserving edges in such current frame to generate a plurality of spatially denoised pixels for the current frame. After the current frame is spatially denoised, a particular pixel of the current frame is both spatially and temporally denoised based on a weighted averaging of the particular pixel's associated spatially denoised pixel from the current frame and pixels from the temporally adjacent frame that have already been spatially and temporally denoised.

In a specific embodiment, spatially denoising the current frame includes applying a bilateral filtering technique to each pixel of the current frame based on a plurality of proximate pixels that are within a region surrounding such each pixel. In a further aspect, each pixel of the current frame being denoised and its proximate pixels include a 3 by 3 grid of pixels surrounding such pixel being denoised. In another aspect, the bilateral filtering technique includes providing a weight for each proximate pixel that is inversely proportional to both a Euclidean distance and a color difference.

In a further embodiment, the plurality of pixels from the temporally adjacent frame include pixels at locations corresponding to the particular pixel and the proximate pixels. In an alternate aspect, the plurality of pixels from the temporally adjacent frame further include interpolated pixels at locations proximate to locations corresponding to the particular pixel and the proximate pixels. In yet another feature, a weight of the particular pixel's associated spatially denoised pixel has a value of one.

In another embodiment, the invention pertains to a camera comprising a detection module for detecting light and generating a video stream and one or more processors and memory that are operable to perform one or more of the above described method embodiments. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Certain embodiments of a denoising technique are described herein with respect to a camera that implements SIMD (single instruction, multiple data) processing on video streams that are captured within the camera. However, other processor architectures, such as sequential processing, multiple instruction/multiple data (MIMD) processing, stream processing (SIMD or MIMD), etc., may be utilized. Additionally, denoising techniques may be employed on the real-time video stream as such stream is captured by the camera or applied to the video stream after such stream is uploaded to any suitable processor, e.g., server or desktop computer.

Low budget cameras typically have limited processing resources for performing denoising operations in real-time on the captured video stream. In general, certain embodiments of the present invention include denoising techniques for efficiently removing or minimizing noise from a video stream with minimal computational requirements in real time (e.g., denoising at a 24 frames per second rate or higher) as described further herein. In certain embodiments, temporal filtering is integrated into a spatial filtering approach by implementing weighted averaging based on both Euclidean and color distance of a subset of surrounding pixels from both a current frame and one or more temporally adjacent frames.

Figure 1:
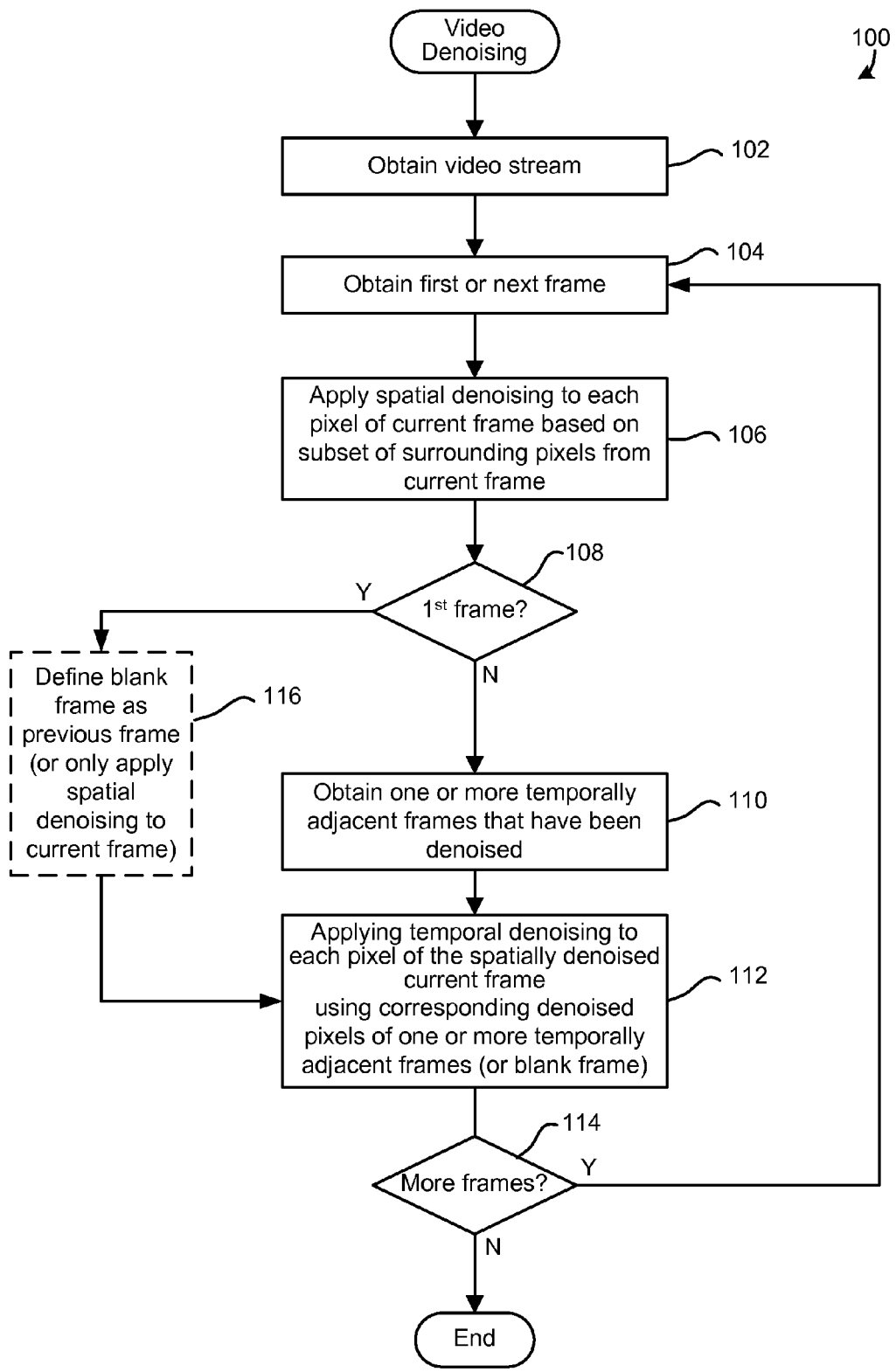
FIG. 1 is a flow chart illustrating a procedure for denoising a video stream in accordance with one example implementation.

FIG. 1 is a flow chart illustrating a procedure 100 for denoising a video stream in accordance with one example implementation. In general, a current frame, $f_t$, is denoised using one or more previous and/or forward frames to account for temporal paths. Although a single previous frame may be used, multiple previous or forward frames may be used to account for longer temporal paths. Additionally, single pixels from each frame may be processed sequentially or multiple pixels from one or more frames may be processed in parallel. For simplicity, a single previous frame, $f_{t-1}$, is used to illustrate the denoising process for each pixel of a current frame, $f_t$.

As shown in FIG. 1, a video stream is obtained in operation 102. A first frame, $f_t$, from the video stream is then obtained in operation 104. For instance, a real-time video stream transfer from the sensor to one or more buffers is initiated. The video stream may be buffered such that particular frames are readily available and obtained for denoising. A video stream may also be processed from a storage device so that the particular frames are read from the storage device.

Spatial denoising may then be initially applied to each pixel of the current frame, $f_t$, in operation 106. Any suitable spatial filtering technique may be used on each pixel of the current frame. A spatial filtering technique can be applied in any number of color spaces. In one embodiment, spatial filtering is applied to a BT.601 full range YCbCr Video Signal. Also, spatial filtering may be applied to each channel individually or extrapolated easily to be applied to the three channels simultaneously.

Figure 2:
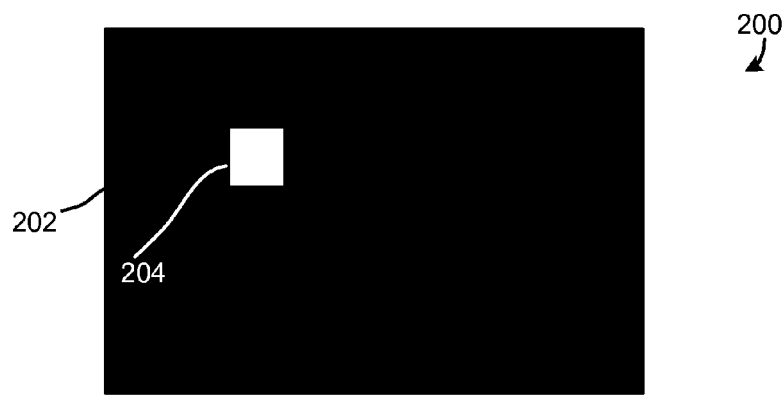
FIG. 2 illustrates a frame that includes a white outlier pixel surrounded by a plurality of black pixels.

If a spatial filtering techniques is used that does not preserve edges, blurring may occur as a result of the denoising process. FIG. 2 illustrates a current frame 200 that includes a white outlier pixel 204 surrounded by a plurality of black pixels 202. If a simple averaging technique is used for the current frame, the white outlier pixel will be changed to a color that is close to black since the average pixel color for the surrounding pixels is black.

Figure 3:
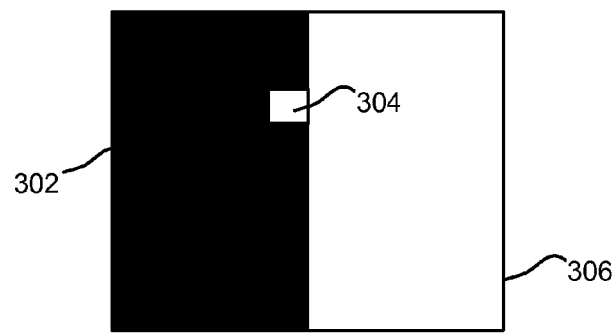
FIG. 3 illustrates a white outlier pixel that lies on the edge between a black column of pixels and a white column of pixels.

Although simple averaging may work well for homogeneous frames, this technique would not work well for edge pixels. FIG. 3 illustrates a white outlier pixel 304 that lies on the edge between a black column of pixels 302 and a white column of pixels 306. If an averaging technique is used, the outlier pixel is denoised to an incorrect gray color, which results in a smoothing effect along the edge.

Bilateral filtering preserves edges by averaging pixels that are closer in Euclidean distance and lower in radiometric differences (differences in the range, e.g. color intensity) with higher weights. In a bilateral approach, the intensity value at each pixel in an image is replaced by a weighted average of intensity values from nearby pixels. Generally, a bilateral technique may require significant resources to determine weights for every pixel of a frame and calculate the final average for every pixel.

Figure 4:
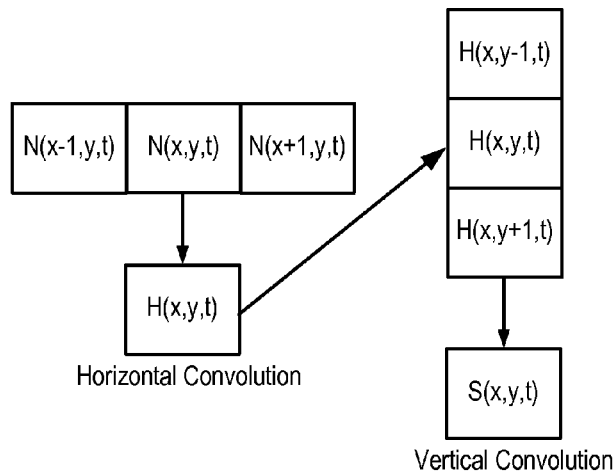
FIG. 4 illustrates a separable bilateral filtering process in accordance with a specific implementation of the present invention.

In one implementation, a separable implementation of a bilateral filter may be efficiently used to preserve edges. FIG. 4 illustrates a separable bilateral filtering process in accordance with a specific implementation of the present invention. Approximate results can be achieved by using a separable approach. Initially, a support region may be constructed around each pixel to be denoised. In the illustrated example, a 3 by 3 grid of pixels are used around each pixel to be denoised.

Although a bilateral filter is configured to be non-linear, a separable approximation is computationally more efficient and provides a good approximation for the spatial filtering operation. One example of a locally adaptive bilateral filter operation for the current frame follows.

A separable bilateral filter can be applied as follows. Equation 1 may be applied to the original noisy frame to obtain the intermediate horizontally filtered image.

$$T_{x,y,t} = \Sigma_{n=-1}^{n=1} N_{x-n,t} * f(x) * g(d) \quad \text{(Eq. 1)}$$

Equation 2 may then be applied to the output of this operation, producing the final spatially denoised image.

$$S_{x,y,t} = \Sigma_{m=-1}^{m=1} T_{x,y-m} * f(x) * g(d) \quad \text{(Eq. 2)}$$

Thus, this two stage step involves the horizontal and vertical oriented convolution steps in a separable convolution operation. Of course, pixels may first be denoised in a vertical direction and then a horizontal direction. Note that the indices in the above equations follow the illustrations in FIG. 4.

The function $f(x)$ may be based on the Euclidean distance of the pixel being weighted to the pixel being denoised. For example, this weight can be based on a Gaussian distribution, in which an increase in Euclidean distance for a pixel results in a lower weight for such pixel. Function $f(x)$ is static because the distance from the current pixel to each adjacent pixel (e.g., top center pixel, bottom center pixel, etc.) stays the same. The only value to control is the sigma value, e.g., the variance of the Gaussian distribution. The higher the value, the wider is the Gaussian curve, resulting in a higher weight for pixels residing far from the pixel of interest. At a high sigma value, depending also on the kernel size the Gaussian curve converges to a box filter, which may be an alternative solution in real time applications.

The function $g(d)$ may be based on the color difference between the pixel being weighted and the pixel being denoised. This function can lead to preservation of sharp edges and complex textures by assigning a spatially adaptive weight to the adjacent pixels accordingly. In one embodiment, the following equation 3 may be used for function $g(d)$.

$$g(d) = \frac{C}{C + d^2} \quad \text{(Eq. 3)}$$

Where d is the color difference and can be defined as:

$$d = |N_{x,y} - N_{x-n,y-m}| \quad \text{(Eq. 4)}$$

A large color difference will result in a lower weight, while a low color difference will result in a higher weight. For instance, a maximum color difference (black vs. white) may result in a 0 weight value, while a minimum color difference (same color) may result in maximum weight of 1.

Figure 6:
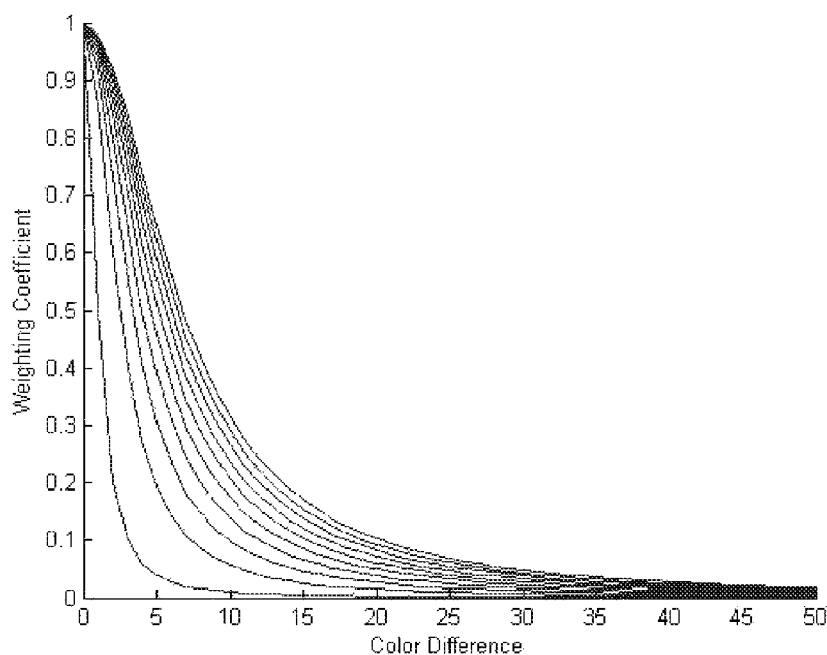
FIG. 6 is a graph of a color weighting coefficient as a function of color difference using different values of a constant C.

The constant C can be an adaptive value that controls the weight curve. A lower C value results in a lower weight overall, while a higher C value results in a higher weight overall. In general, C can be selected to control how inclusive the averaging process is going to be with respect to including pixels with high color differences from the current pixel. In other words a higher value of C will allow pixels that have high color difference from the current pixel to be included more into the averaging process by assigning them a higher weight. FIG. 6 illustrates the weight value response as a function of different C values.

The function g(d) can be efficiently implemented, even without the direct support of a LUT (look up table). For each pixel being weighted, the above equation 3 is evaluated. For a 3×3 grid (non-separable), this implies that equation 3 will be "evaluated eight times for each pixel (The central pixel is skipped as this central pixel will obviously have an implied value of one since this pixel will effectively be the pixel being denoised)". The evaluation of each pixel can be done in three clock cycles: one for the squaring operation; one for the summation; and one for the division. The division operation can be performed using a 1 cycle 8-bit floating point division.

Referring back to the illustrated denoising procedure of FIG. 1, it may then be determined if the current frame is the first frame in operation 108. This determination step may be used to determine whether there are no previous (or forward) frames that have been already spatially and/or temporally denoised. If the current frame is the first frame, a blank frame may be defined as a previous frame in operation 116. Alternatively, only spatial denoising is applied to the current frame without implementation of temporal denoising. For example, operations 110 and 112 are skipped.

If the current frame is not the first frame (to be denoised), one or more temporally adjacent frames that have been spatially and temporally denoised can be obtained in operation 110. Temporal denoising may then be applied to each pixel of the current frame using corresponding denoised pixels of the one or more temporally adjacent frames (or blank frame) in operation 112. If a blank frame is used, the blank frame is affectively ignored for the image area since corresponding pixels of the blank frame will be significantly different from the current frame. This outcome occurs because the temporal filter, in a way, follows the same rules as the spatial filter.

The previously spatially and temporal filtered one or more frames can be used as reference. In a specific implementation, the temporal filtering operation for determining a final denoised pixel ($ST_{x,y,t}$) for the current frame based on a single previous frame is:

$$ST_{x,y,t}(\Sigma_{p=-1}^{p=1}\Sigma_{m=-1}^{m=1} ST_{x-m,y-p,t-1} f(x)*g(d)) + S_{x,y,t} \quad \text{(Eq. 5)}$$

The current spatially denoised pixel $S_{x,y,t}$ may be given a weight of one in order to avoid motion blurring and retain the motion between frames. In one embodiment, all 9 pixels from the one or more temporally adjacent frames and the current spatially denoised pixel are averaged together.

Figure 5:
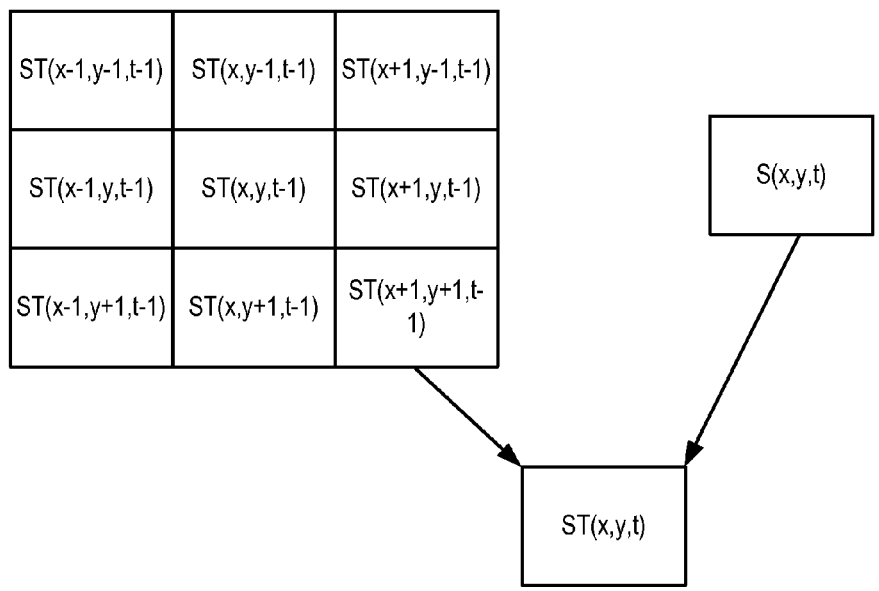
FIG. 5 illustrates expansion of the bilateral filtering process of FIG. 4 with temporal denoising in accordance with one embodiment.

FIG. 5 illustrates expansion of the bilateral filtering process of FIG. 4 with temporal denoising in accordance with one embodiment. As shown, the current pixel is averaged with the pixels from previous frame(s). In effect, motion estimation is included into a temporal bilateral filter so as to preserve the motion effects since more similarly colored and physically approximate pixels from the temporally adjacent frame are weighted higher. This technique can be performed without a separate registration process so that moving objects are aligned from adjacent frames.

In other words, the above extension does not require a motion estimation step since pixels are weighted using the pre-defined rules as described above, along all the motion estimation paths. Hence, only the pixels which are close in color distance will be weighed in. For instance, previous frame $f_{t-1}$ pixels that are closest to the original position of $S_{x,y,t}$ will be given a higher weight by the adaptive temporal weighting technique described herein. Hence, a motion estimation step has effectively been integrated into the denoising operation.

Spatial filtering can significantly reduce the inter-frame variance. The spatial step can act to smooth the pixel and bring consecutive frames closer in variance before applying the temporal step. If the temporal step is applied without the spatial step being applied, a noisy pixel in the current frame $f_t$ would be an outlier, compared to the reference pixels from frame $f_{t-1}$, making the denoising process useless.

The illustrated procedure of FIG. 4 may be applied to all frames of a video stream. Thus, it may then be determined whether there are more frames in operation 114. If there are more frames, the denoising procedure is repeated for a next frame (e.g., operation 104). If there are no more frames to process, the denoising process ends.

Interpolated intensity values, in addition to or instead of actual pixel values, can be used in the temporal filtering process, which may give improved results. That is, the values being used in the spatial and temporal filtering may include sub-pixel interpolation between the pixels being weighted in. Sometimes an N×N filter may be too aggressive to capture the motion. Hence, the interpolated values around the pixel being denoised on a bilinear grid may be included into the denoising process.

Figure 8:
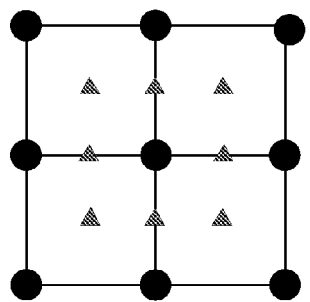
FIG. 8 illustrates expansion of the bilateral filtering process of FIG. 4 with temporal denoising using interpolated pixels in accordance with an alternative embodiment.

One example of an interpolation process is illustrated in FIG. 8. The black circular pixels of FIG. 8 illustrate the same pixels shown in FIG. 5. The triangles represent the interpolated pixels. In this example, 17 pixels can be used to actually participate in the filtering process. FIG. 8 illustrates the normal and interpolated pixels coming from the reference frame $f_{t-1}$ for a 3×3 kernel.

The interpolated pixels can be calculated using any suitable technique. For example, the diagonal interpolated pixels can be set to an average of the equally weighted four surrounding pixels, while the vertical and horizontal interpolated pixels can be derived from the two relatively adjacent pixels.

Certain embodiments of the filtering technique described herein have several associated advantages. At a scene change, certain algorithm embodiments can handle a temporal discontinuity automatically since all non-similar temporal pixels will be rejected with the weighting equation g(d). This approach removes the requirement of a complex scene detection algorithm.

Certain filtering embodiments can allow hand held devices with minimal computational requirements to accomplish high accuracy denoising. The efficient implementation of a spatio-temporal filter can provide a fast and parallel implementation targeting SIMD computer architectures, while minimizing theoretical computational complexity and memory bandwidth. Certain filter embodiments can handle slow to fast motion without the introduction of any motion blur. In practice, the approaches described herein can achieve improved denoising speeds and scale with image size, achieving real-time performance for various image resolutions. Certain system embodiments can handle real world noise found on videos captured on typical camera sensors. Additionally, no registration or alignment is needed.

The disclosed techniques of the present invention may be implemented in any suitable combination of software and/or hardware system, such as a hand held camera, mobile device, or general computer system. Moreover, a system implementing various embodiments of the invention may take the form of a portable device having a camera, such as tablet or cell phone. The apparatus of this invention may be specially constructed for implementing techniques of the present invention in real time, or it may be a general-purpose computer configured with a computer program and/or data structures stored in such computer.

Figure 7:
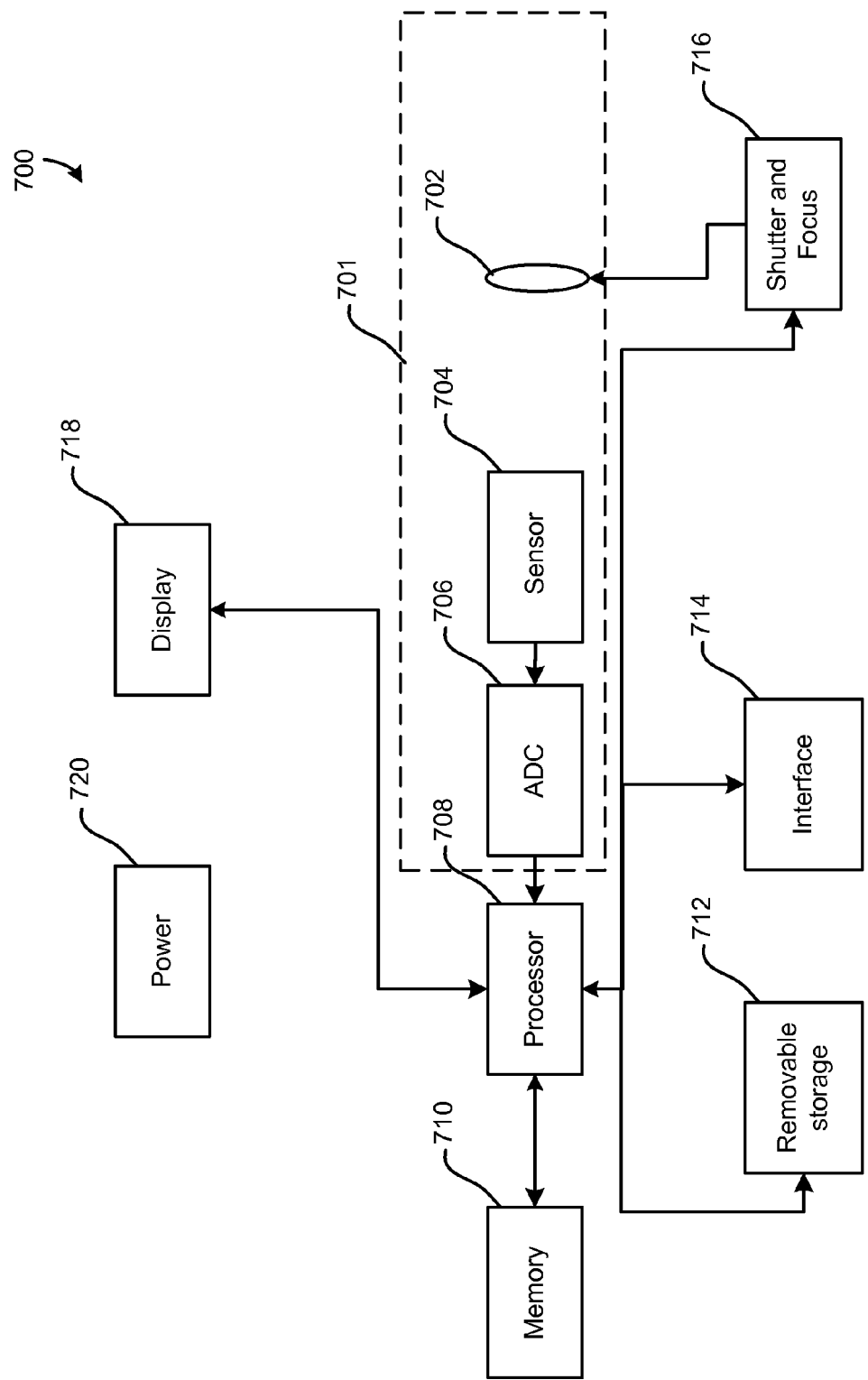
FIG. 7 is a block diagram of a typical camera system suitable for implementing an embodiment of the present invention.

FIG. 7 is a block diagram of a typical camera system 700 suitable for implementing an embodiment of the present invention. The system 700 may include any number and type of detection components or modules 701 for detecting light and generating a video stream. In the illustrated example, the system 700 includes one or more lens 702 for receiving light for capturing a video. A shutter and focus module 716 may be configured to control focus and shutter speed for such one or more lens 702. The system may also include one or more sensors 704 (e.g., CCD) for receiving light from the lens 702 and generating one or more detected signals. An analog-to-digital converter (ADC) 706 may be arranged to receive the one or more detected signals from sensor 704 and generate a digital signal to form a video stream.

The system 700 may include any number of processors 708 (also referred to as central processing units, or CPUs) that process the digital signal output by the ADC 706. More specialized units, such as ISP (Image Signal Processor) or DSP (Digital Signal Processor) may additionally or alternatively be used. The one or more processors 708 may implement SIMD (single instruction, multiple data) processing on video streams that are captured within the camera. However, other processor architectures, such as sequential processing, multiple instruction/multiple data (MIMD) processing, stream processing (SIMD or MIMD), etc. may also be employed.

The CPU 708 may be coupled with one or more storage devices, such as memory 710 (e.g., a random access memory or RAM and a read only memory, or ROM). CPU 708 may be of various types including microcontrollers and microprocessors such as programmable devices (e.g., CPLDs and FPGAs) and unprogrammable devices such as gate array ASICs or general-purpose microprocessors. As is well known in the art, data and instructions may be transferred uni-directionally or bi-directionally between the memory 710 and the CPU 708. Memory 710 may include any suitable number and type of computer-readable media such as those described herein. A removable storage device 712 may also be coupled bi-directionally to CPU 708 and provide additional data storage capacity and may include any of the computer-readable media described herein. Portable storage device 712 may be used to store video and image data, for example, on a removable non-volatile memory card or stick in any suitable format. A portable storage device 712 may also pass data uni-directionally to the CPU.

CPU 708 may also be coupled to an interface 714 that connects to one or more input/output devices, such as video monitors or displays, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 708 optionally may be coupled to an external device such as a database or a computer or telecommunications network using an external connection as shown generally at 714. CPU 708 may also be coupled with any other suitable peripheral devices, such as display 718. The system may include any number and type of power sources or interfaces 720.

Regardless of the system's configuration (e.g., client or server), it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods or any other display features, etc.

Because such information and program instructions may be employed to implement the systems/methods described herein, the present invention relates to machine or computer readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of denoising a video stream of a camera, the method comprising:
    obtaining a current frame of the video stream of the camera;
    obtaining a temporally adjacent frame of the video stream that has been previously spatially and temporally denoised;
    spatially denoising the current frame while preserving edges in such current frame to generate a plurality of spatially denoised pixels for the current frame; and
    after the current frame is spatially denoised, temporally denoising a particular pixel of the current frame based on a weighted averaging of the particular pixel's associated already spatially denoised pixel from the current frame and a plurality of pixels from the temporally adjacent frame that have already been spatially and temporally denoised.

2. The method of claim 1, wherein spatially denoising the current frame includes applying a bilateral filtering technique to each pixel of the current frame based on a plurality of proximate pixels that are within a region surrounding such each pixel.

3. The method of claim 2, wherein each pixel of the current frame being denoised and its proximate pixels include a 3 by 3 grid of pixels surrounding such pixel being denoised.

4. The method of claim 2, wherein the bilateral filtering technique includes providing a weight for each proximate pixel that is inversely proportional to both a Euclidean distance and a color difference.

5. The method of claim 4, wherein the plurality of pixels from the temporally adjacent frame include pixels at locations corresponding to the particular pixel and the proximate pixels.

6. The method of claim 5, wherein the plurality of pixels from the temporally adjacent frame further include interpolated pixels at locations not corresponding to the particular pixel and the proximate pixels.

7. The method of claim 5, wherein a weight of the particular pixel's associated spatially denoised pixel has a value of one.

8. A camera comprising:
an image sensor configured to receive light and generate a detected signal;
one or more processors and memory that are operable to perform the following:
obtaining a current frame of a video stream of the camera wherein the video stream is generated based on the detected signal;
obtaining a temporally adjacent frame of the video stream that has been previously spatially and temporally denoised;
spatially denoising the current frame while preserving edges in such current frame to generate a plurality of spatially denoised pixels for the current frame; and
after the current frame is spatially denoised, temporally denoising a particular pixel of the current frame based on a weighted averaging of the particular pixel's associated already spatially denoised pixel from the current frame and a plurality of pixels from the temporally adjacent frame that have already been spatially and temporally denoised.

9. The camera of claim 8, wherein spatially denoising the current frame includes applying a bilateral filtering technique to each pixel of the current frame based on a plurality of proximate pixels that are within a region surrounding such each pixel.

10. The camera of claim 9, wherein each pixel of the current frame being denoised and its proximate pixels include a 3 by 3 grid of pixels surrounding such pixel being denoised.

11. The camera of claim 9, wherein the bilateral filtering technique includes providing a weight for each proximate pixel that is inversely proportional to both a Euclidean distance and a color difference.

12. The camera of claim 11, wherein the plurality of pixels from the temporally adjacent frame include pixels at locations corresponding to the particular pixel and the proximate pixels.

13. The camera of claim 12, wherein the plurality of pixels from the temporally adjacent frame further include interpolated pixels at locations not corresponding to the particular pixel and the proximate pixels.

14. The camera of claim 12, wherein a weight of the particular pixel's associated spatially denoised pixel has a value of one.

15. At least one non-transitory computer readable storage medium having computer program instructions stored thereon that are arranged to perform the following operations:
obtaining a current frame of a video stream of a camera;
obtaining a temporally adjacent frame of the video stream that has been previously spatially and temporally denoised;
spatially denoising the current flame while preserving edges in such current flame to generate a plurality of spatially denoised pixels for the current frame; and
after the current flame is spatially denoised, temporally denoising a particular pixel of the current flame based on a weighted averaging of the particular pixel's associated already spatially denoised pixel from the current flame and a plurality of pixels from the temporally adjacent flame that have already been spatially and temporally denoised.

16. The at least one non-transitory computer readable storage medium of claim 15, wherein spatially denoising the current frame includes applying a bilateral filtering technique to each pixel of the current frame based on a plurality of proximate pixels that are within a region surrounding such each pixel.

17. The at least one non-transitory computer readable storage medium of claim 16, wherein the bilateral filtering technique includes providing a weight for each proximate pixel that is inversely proportional to both a Euclidean distance and a color difference.

18. The at least one non-transitory computer readable storage medium of claim 17, wherein the plurality of pixels from the temporally adjacent frame include pixels at locations corresponding to the particular pixel and the proximate pixels.

19. The at least one non-transitory computer readable storage medium of claim 18, wherein the plurality of pixels from the temporally adjacent frame further include interpolated pixels at locations not corresponding to the particular pixel and the proximate pixels.

20. The at least one non-transitory computer readable storage medium of claim 18, wherein a weight of the particular pixel's associated spatially denoised pixel has a value of one.

* * * * *